United States Patent
Hu et al.

(10) Patent No.: US 12,089,088 B2
(45) Date of Patent: Sep. 10, 2024

(54) METHOD OF AND EQUIPMENT FOR PERFORMING TRANSFER OF DATA PACKETS IN END-TO-END MULTIHOP SIDELINK RADIO COMMUNICATION

(71) Applicant: Telefonaktiebolaget LM Ericsson (publ), Stockholm (SE)

(72) Inventors: Liang Hu, San Diego, CA (US); Ajmal Muhammad, Sollentuna (SE); Congchi Zhang, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 325 days.

(21) Appl. No.: 17/765,511

(22) PCT Filed: Oct. 4, 2019

(86) PCT No.: PCT/EP2019/076920
§ 371 (c)(1),
(2) Date: Mar. 31, 2022

(87) PCT Pub. No.: WO2021/063519
PCT Pub. Date: Apr. 8, 2021

(65) Prior Publication Data
US 2022/0369164 A1    Nov. 17, 2022

(51) Int. Cl.
*H04W 4/00* (2018.01)
*H04W 28/02* (2009.01)
(Continued)

(52) U.S. Cl.
CPC ... *H04W 28/0967* (2020.05); *H04W 28/0268* (2013.01); *H04W 40/22* (2013.01);
(Continued)

(58) Field of Classification Search
None
See application file for complete search history.

(56) References Cited

U.S. PATENT DOCUMENTS 11,937,134 B1 * 3/2024 Fang ............... H04W 36/0069
11,963,250 B2 * 4/2024 Kim ..................... H04W 76/25
(Continued)

FOREIGN PATENT DOCUMENTS

CN    108375363 A    8/2018
CN    109644518 A    4/2019
(Continued)

OTHER PUBLICATIONS

3GPP, "3rd Generation Partnership Project; Technical Specification Group Radio Access Network; NR; Study on Integrated Access and Backhaul; (Release 16)", 3GPP TR 38.874 V16.0.0, Dec. 2018, 111 pages.
(Continued)

*Primary Examiner* — Bob A Phunkulh
(74) *Attorney, Agent, or Firm* — Murphy, Bilak & Homiller, PLLC (57) ABSTRACT

A method (80) of performing transfer of data packets requiring a specified Quality of Service, QoS, by a User Equipment, UE, in an end-to-end, E2E, multi-hop sidelink radio communication (81). The UE comprises a processor operated protocol stack arranged for providing Physical, PHY, layer functionality, Media Access Control, MAC, layer functionality, Radio Link Control, RLC, layer functionality, and Adaptation, Adapt, layer functionality. The RLC layer functionality providing a plurality of ingress and egress RLC channels for transferring data packets. The method comprising receiving (83), by the RLC layer functionality, data packets a tan ingress RLC channel, mapping (84), by the Adapt layer functionality, data packets received at the ingress RLC channel to an egress RLC channel in accordance with a mapping rule for destining the data packets while maintaining the specified QoS, and transferring (86),
(Continued)

by the RLC layer functionality, the mapped data packets at the egress RLC channel.

14 Claims, 6 Drawing Sheets

(51) Int. Cl.
*H04W 28/08* (2023.01)
*H04W 40/22* (2009.01)
*H04W 88/04* (2009.01)
*H04W 92/08* (2009.01)
*H04W 92/16* (2009.01)

(52) U.S. Cl.
CPC ............ *H04W 88/04* (2013.01); *H04W 92/08* (2013.01); *H04W 92/16* (2013.01)

(56) References Cited

U.S. PATENT DOCUMENTS

| | | | |
|---|---|---|---|
| 12,035,365 B2 * | 7/2024 | Park | H04B 17/318 |
| 2012/0039245 A1 * | 2/2012 | Wang | H04B 7/155 |
| | | | 370/315 |
| 2017/0164182 A1 | 6/2017 | Hu et al. | |
| 2018/0054237 A1 * | 2/2018 | Tseng | H04B 7/026 |
| 2018/0124633 A1 * | 5/2018 | Hwang | H04W 72/566 |
| 2019/0053179 A1 * | 2/2019 | Taylor | H04W 56/0025 |
| 2019/0097936 A1 | 3/2019 | Yang et al. | |
| 2019/0253927 A1 * | 8/2019 | Mok | H04W 28/0268 |
| 2019/0289492 A1 * | 9/2019 | Hampel | H04W 76/12 |
| 2020/0008173 A1 * | 1/2020 | Kim | H04W 76/10 |
| 2020/0037218 A1 * | 1/2020 | Karampatsis | H04W 88/04 |
| 2020/0059980 A1 * | 2/2020 | Hong | H04W 8/005 |
| 2020/0187152 A1 * | 6/2020 | Karampatsis | H04W 4/06 |
| 2020/0196387 A1 * | 6/2020 | Roy | H04W 4/80 |
| 2021/0282050 A1 * | 9/2021 | Adjakple | H04L 1/1874 |
| 2021/0297842 A1 * | 9/2021 | Shrivastava | H04W 28/24 |
| 2021/0329487 A1 * | 10/2021 | Wang | H04W 28/24 |
| 2022/0279609 A1 * | 9/2022 | Wu | H04W 76/14 |
| 2022/0322469 A1 * | 10/2022 | Yang | H04W 76/12 |

FOREIGN PATENT DOCUMENTS

| | | |
|---|---|---|
| CN | 109842440 A | 6/2019 |
| CN | 110536310 A | 12/2019 |
| JP | 2020512777 A | 4/2020 |
| JP | 2021518697 A | 8/2021 |
| WO | 2018084199 A1 | 5/2018 |

OTHER PUBLICATIONS

3GPP, "Study on LTE Based V2X Services", 3GPP TR 36.885 V14.0.0, Jun. 2016, 216 pages.
3GPP, "3GPP TR 22.866 V0.4.0", 3rd Generation Partnership Project; Technical Specification Group Services and System Aspects; enhanced Relays for Energy Efficiency and Extensive Coverage; Stage 1 (Release 17), Aug. 2019, 1-41.
3GPP, "3GPP TS 23.303 V15.1.0", 3rd Generation Partnership Project; Technical Specification Group Services and System Aspects; Proximity-based services (ProSe); Stage 2 (Release 15), Jun. 2018, 1-130.
Ericsson, "On Rel-17 Public Safety", 3GPP TSG-RAN Meeting #84, Tdoc RP-191053, Newport Beach, California, USA, Jun. 3-6, 2019, 1-6.
Intel Corporation, "Considerations on Sidelink Communication Enhancements for Wearable and IoT Use Cases", 3GPP TSG RAN1 WG Meeting #88bis, R1-1704706, Spokane, USA, Apr. 3-7, 2017, 1-7.
Omesh Networks, "TP on Multihop Communications in 3GPP 5G", 3GPP TSG-SA WG1 Meeting #84, S1-183102, Spokane, USA, Nov. 12-16, 2018, 1-3.
Samsung, "Fundamental issues for adaptation layer design", 3GPP TSG-RAN WG2 #105-Bis, R2-1904185, revision of R2-1901159, Xi'an, PRC, Apr. 8-12, 2019, 1-5.
Samsung, "QoS framework in IAB network", 3GPP TSG-RAN WG2 Meeting #105bis, R2-1903683, Xi'an, China, Apr. 8-12, 2019, 1-7.
"Adaptation layer based L2 relaying and light L2 relaying", 3GPP TSG-RAN WG2 #99bis, R3-181999, Huawei, Hisilicon, Sanya, China, Apr. 16-20, 2018, 9 pages.
"Why is PC5 PDCP Missing from L2 Relaying Radio Protocol Stack?", 3GPP TSG RAN WG2 Meeting #97, R2-1701341, Huawei, HiSilicon, Athens, Greece, Feb. 13-17, 2017, 4 pages.

* cited by examiner

METHOD OF AND EQUIPMENT FOR PERFORMING TRANSFER OF DATA PACKETS IN END-TO-END MULTIHOP SIDELINK RADIO COMMUNICATION

TECHNICAL FIELD

The present disclosure generally relates to radio communication and, in particular, to a method of and User Equipment and Radio Access Network equipment for performing transfer of data packets requiring a specified Quality of Service in end-to-end multi-hop sidelink radio communication.

BACKGROUND

Sidelink is a method of direct radio communication between User Equipment, UE, provided by their long-range or network radio transceivers, without intermediate Radio Access Network, RAN, equipment, and is first introduced in 3rd Generation Partnership Project, 3GPP, Release 12, relating to Long Term Evolution, LTE. Sidelink is an adaptation of the core LTE standard that allows for device-to-device, D2D, communication between two or more nearby devices, without the need of a Radio Access Network, RAN, unit, such as a base station.

In uplink/downlink communication of a cellular-based legacy LTE RAN, two UEs communicate through their so-called Uu interface protocol. Any data exchanged between these UEs always traverse an LTE Evolved Node Base, eNB. In contrast, sidelink enables direct communication between proximal UEs using the so-called PC5 interface protocol, while data exchanged between these UEs do not pass an eNB. In the Fifth Generation, 5G, New Radio, NR, technology, sidelink enhancement is a topic still under discussion.

D2D communication using sidelink may be used for various applications, one of which being Public Safety Communications, PSCs, for example. PSCs involve exchange of critical information between fellow agencies within a public safety authority or between different authorities and organizations. PSCs may take place under various network conditions, including UEs being in-network coverage, that is wherein the UE is in the coverage area of a RAN unit or network cell, out-of-network coverage, wherein the UE communicates, for example, with another UE without an intermediate RAN unit, or in partial network coverage, wherein the UE connects to a RAN unit through, for example, one or more intermediate UEs. Sidelink communication technology plays a key role to provide PSCs in partial network coverage and out-of-network coverage.

In 3GPP TS 23.303 "Proximity-based services (ProSe)" Stage 2, LTE ProSe sidelink communication is specified, for supporting basic public safety communication use cases. Presently, NR sidelink enhancement is envisioned to be specified to support advanced public safety communication use cases. In particular, one of the key features under study is the multi-hop UE relay concept, which is required for PSC non-line-of-sight, N-LOS, conditions, such as firefighter D2D communications between basement and high floors in a multi story building, for example.

Another important application supported by sidelink is vehicle-to-everything, V2X, communications as specified in 3GPP TR 36.885, "Study on LTE-based V2X Services". V2X communication may take advantage of a network infrastructure, when available, however at least basic V2X connectivity should be possible even in case of lack of coverage via LTE sidelink.

Figure 1:
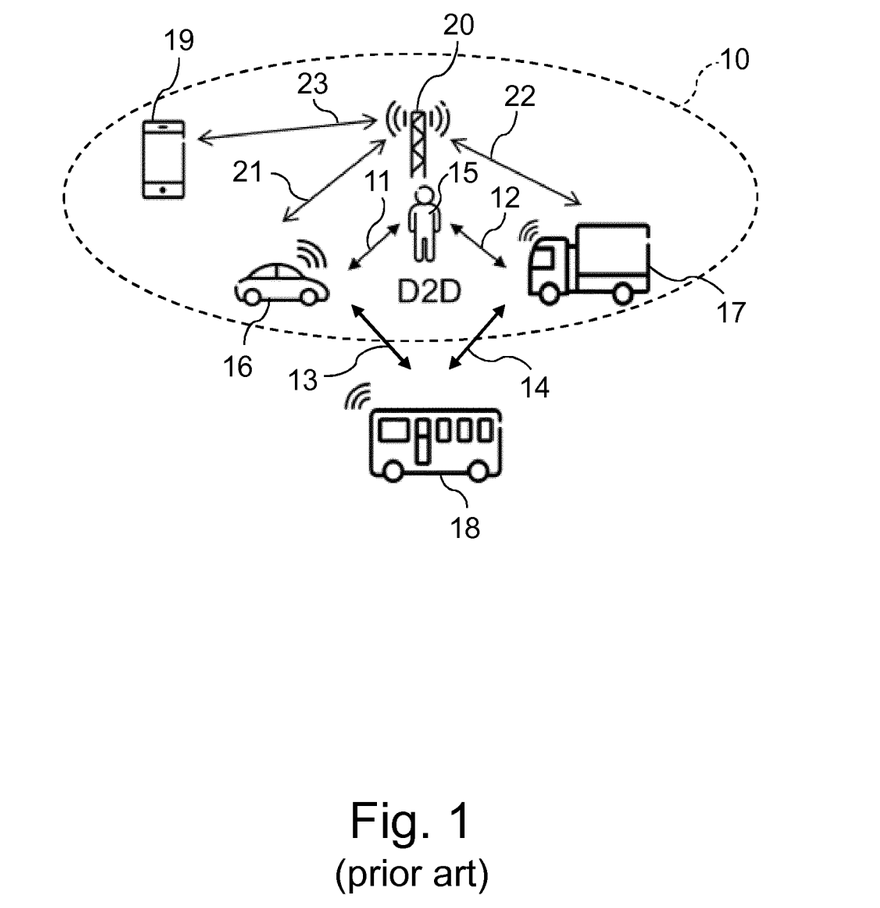
FIG. 1 illustrates a Vehicle to everything, V2X, scenario for an LTE-based network.

FIG. 1 schematically illustrates a V2X scenario for an LTE-based network, comprising D2D communications 11, 12, 13, 14 between a pedestrian 15, a car 16, a truck 17 and a bus 18, where the bus is out of network coverage 10 of the radio access unit eNB 20. The car 16, the truck 17 and mobile User Equipment 19 also have an uplink/downlink radio link 21, 22, 23, respectively, with the eNB 20.

For LTE sidelink V2X communications, both non-safety and safety information may be exchanged, wherein each of applications and services involved in the communications may be associated with various sets of QoS requirements specified, for example, in terms of latency, reliability, data exchange capacity, and so on.

As for PSC applications, data exchanged via sidelink generally requires a relatively high Quality of Service, QoS, as these typically process security related mission critical traffic including voice, video and data. In general, PSC traffic or data packets need to be transferred from end-to-end, possibly via multiple intermediate relay UEs, with guaranteed QoS metrics, such as short latency and high reliability.

According to 3GPP TS 23.303 Release 15, QoS control is based on the concept of ProSe Per-Packet Priority, PPPP, and ProSe Per-Packet Reliability, PPPR, which respectively allow an application layer to pass to lower layers a priority or reliability indicator of a certain data packet, together with the data packet for transmission, to indicate the relative priority or reliability of such a data packet. The PPPP allows for prioritization of packets while the PPPR allows duplication of packets.

As for NR V2X, it is proposed that a sidelink QoS flow model is adopted. For example, according to the per-flow QoS model, upper layers of a UE in D2D communication map each data packet to a sidelink QoS flow, such as an associated PC5 QoS flow which, in turn, is mapped to a sidelink radio bearer. Sidelink radio bearer, SLRB, configuration including the QoS flow to SLRB mapping is either preconfigured or configured by a RAN unit, such as a next generation Node Base, gNB, when the UE is in coverage.

Integrated Access and Backhaul, IAB, framework as a cost-effective alternative to the wired backhaul, is currently under study. In 3GPP TR 38.874, "Study on Integrated Access and Backhaul" Release 16, QoS mapping in IAB is discussed. According to 3GPP TR 38.874, an IAB-node, which is a RAN unit supporting wireless access to UEs and wirelessly backhauling access traffic, multiplexes Data Radio Bearer, DRBs of a UE to backhaul Radio Link Control, RLC, channels. The mapping may be a one-to-one mapping between UE DRB and backhaul RLC channels or many-to-one mapping between DRBs and backhaul RLC channels. All traffic mapped to a single backhaul RLC channel may receive the same QoS treatment on the air interface.

Since the backhaul RLC channel multiplexes data from/to multiple bearers, and possibly even different UEs, each data block transmitted in the backhaul RLC-channel needs to contain an identifier of the UE, DRB, and/or IAB-node it is associated with. Exact identifiers needed and inclusion of these identifier(s) within the adaptation layer header depends on the architecture/protocol option.

A scheduler on a wireless backhaul link can distinguish QoS profiles associated with different RLC channels. For one-to-one mapping between UE bearer and RLC channel on the backhaul, appropriate QoS differentiation among QoS profiles can be applied and fairness among UE bearers with same QoS profile is available. While QoS differentiation is still possible for UE bearers aggregated to backhaul RLC channels, enforcement of fairness across UE bearers becomes less granular.

Figure 2:
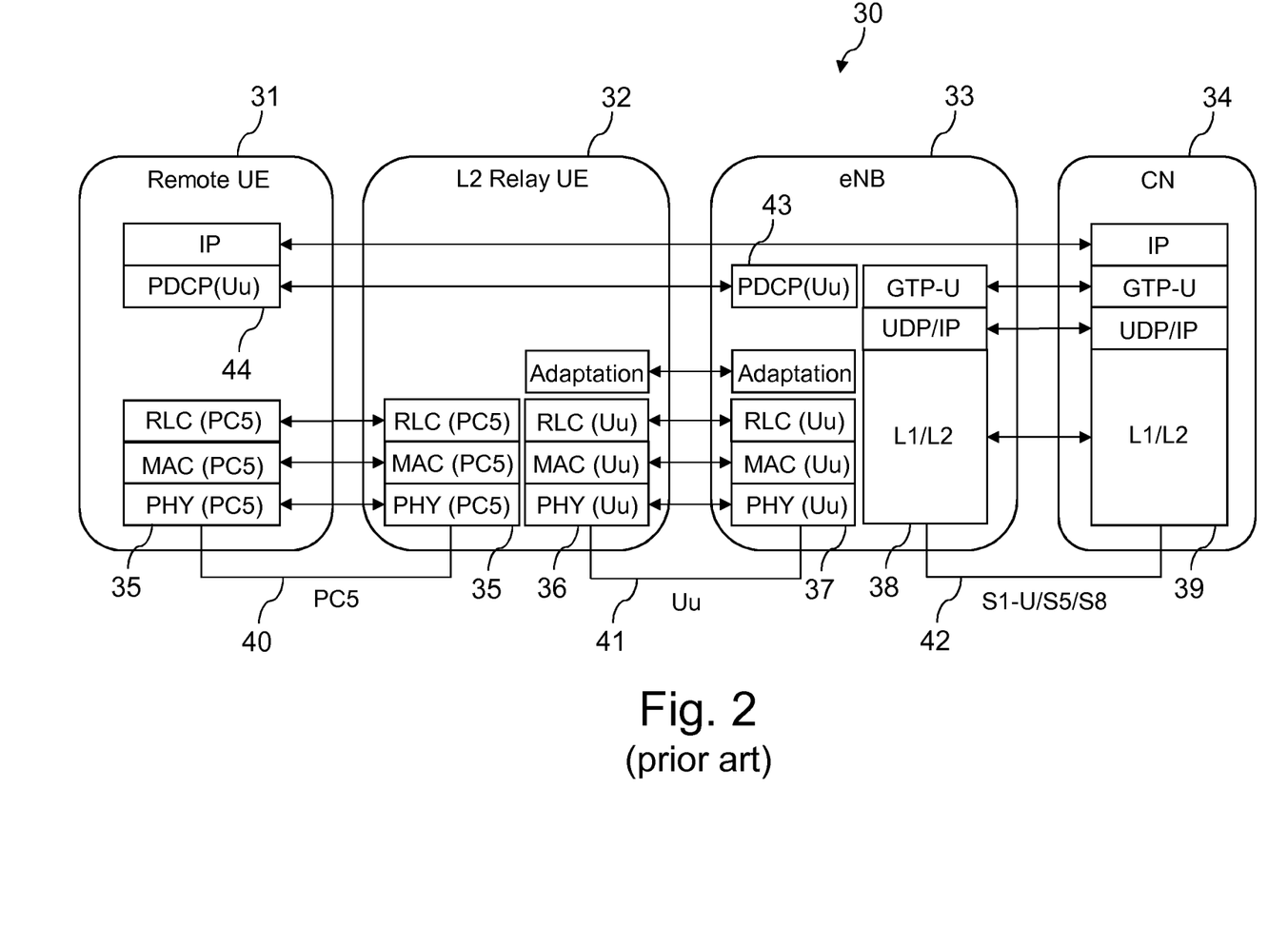
FIG. 2 schematically illustrates a protocol architecture for user plane, UP, that supports LTE Layer 2, L2, for evolved UE-to-Network relay UE communication, in accordance with the prior art.

FIG. 2 schematically illustrates a protocol architecture 30 for user plane, UP, that supports LTE Layer 2, L2, for evolved UE-to-Network relay UE communication, between a remote UE 31, and the Core Network, CN, 34 through an intermediate L2 Relay UE 32 and the eNB 33. This is an example of partial network coverage, wherein the remote UE 31 is not in the radio coverage area of the eNB 33, and indirectly connects to the eNB 33 via an intermediate or relay UE 32 that is in the radio coverage area of the eNB 33.

UE 31 and UE 32 both comprise a PC5 protocol stack 35 arranged for providing Physical, PHY, layer functionality, Media Access Control, MAC, layer functionality, Radio Link Control, RLC, layer functionality, supporting the PC5 interface protocol, indicated as PHY (PC5), MAC (PC5) and RLC (PC5), and a Uu protocol stack 36 arranged for providing Physical, PHY, layer functionality, Media Access Control, MAC, layer functionality, Radio Link Control, RLC, layer functionality, supporting the Uu interface protocol, indicated as PHY (Uu), MAC (Uu) and RLC (Uu). Because the remote UE 31 directly communicates with the L2 Relay UE 32, the Uu protocol stack 36 of UE 31 is not shown.

The eNB 33 comprises a Uu protocol stack 37 arranged for providing Physical, PHY, layer functionality, Media Access Control, MAC, layer functionality, Radio Link Control, RLC, layer functionality, supporting the Uu interface protocol, and an L1/L2 network protocol stack 38. CN 34 comprises an L1/L2 network protocol stack 39.

As indicated in FIG. 2, data between the remote UE 31 and the L2 Relay UE 32 are exchanged in a sidelink communication in accordance with the PC5 protocol 40. Data between the L2 Relay UE 32 and the eNB 33 are exchanged in accordance with the Uu protocol 41, and date between the eNB 33 and the CN 34 are exchanged in accordance with one of the S1 interface, Uu interface, S5 interface and S8 interface protocol as defined in LTE, and indicated by reference numeral 42.

In the protocol architecture of FIG. 2, relay functionality is performed above the RLC layer functionality. That is, UP data are forwarded via the L2 Relay UE 32 from/to the eNB 33 supported by Packet Data Convergence Protocol, PDCP, functionality 43 configured for the Uu protocol stack 37 of the eNB 33, indicated by PDCP (Uu), and PDCP functionality 44 configured for the PC5 protocol stack 35, of the remote UE 31, indicated by PDCP (PC5).

For completeness sake, Internet Protocol, IP, protocol stack functionality for supporting IP based communications protocols are also indicated in respective protocol stacks of the remote UE 31, eNB 33 and CN 34 in FIG. 2. That is, designated IP, GPRS Tunneling Protocol-U, GTP-U, and User Datagram Protocol/IP, UDP/IP, in accordance with LTE.

Data exchange of one or multiple remote UEs 31 may be mapped to a single Data Radio Bearer, DRB, of the Uu interface of the L2 Relay UE 32. Multiple Uu DRBs may be used to carry traffic of different QoS classes, for one or multiple remote UEs 31. It is also possible to multiplex data traffic of the L2 Relay UE 32 itself onto the Uu DRB, which is used to relay traffic to/from remote UEs 31.

In the case of PC5, different DRBs are distinguished on the sidelink by different RLC channel IDs, RLCIDs, and this distinction is made by Adaptation layer functionality of the Uu protocol stack 36 of the L2 relay UE 32 and Adaptation layer functionality of the Uu protocol stack 37 of the eNB 33, as described below. Detailed methods for mapping the traffic between sidelink bearers and Uu bearers is up to the eNB 33 implementation and the mapping is configured in the L2 relay UE 32 by the eNB 33. The adaptation layer over Uu is supported to identify the remote UE/relay UE and the corresponding data radio bearer.

The adaptation layer between the L2 relay UE 32 and the eNB 33 is able to differentiate between bearers, i.e. signaling radio bearers, SRBs, and data radio bearers, DRBs, of a particular remote UE. The QoS associated with different bearers between the L2 relay UE 32 and the eNB 33 can be applied. End-to-end bearer-level QoS for the remote UE 31 is, however, not guaranteed.

One solution for providing end-to-end QoS is for the adaptation layer to map the Uu QoS Class indicator, QCI, to PC5 QoS parameters such as PPPP/PPPR, and tag it to data packets transmitted over the sidelink when delivering to the lower layer functionality of a UE. The situation is different in NR, since sidelink QoS flow and radio bearer framework is adopted and each SL Logical Channel, LCH, is associated with QoS requirements such as data rate, latency, and reliability.

Besides, existing 3GPP Release 16 NR sidelink does not support multi-hop relay function with QoS differentiation. Sidelink multi-hop relay function with QoS differentiation is important for enabling a public safety user case with different mission critical traffic including voice, video and data.

Accordingly, there is a need for a method of transferring data packets between a source communication unit and a destination communication unit in D2D multi-hop sidelink communication while maintaining a specified QoS required by the data packets. It is also desirable that such a method may also support QoS differentiation in case of a multi-hop relay.

SUMMARY

The above mentioned and other objects are achieved, in a first aspect of the present disclosure, by a method of performing transfer of data packets requiring a specified Quality of Service, QoS, by a User Equipment, UE, in an end-to-end, E2E, multi-hop sidelink radio communication. The UE comprising a processor operated protocol stack having an ingress and egress, the protocol stack at least arranged for providing Physical, PHY, layer functionality, Media Access Control, MAC, layer functionality, Radio Link Control, RLC, layer functionality, and Adaptation, Adapt, layer functionality, the RLC layer functionality providing a plurality of ingress and egress RLC channels for transferring data packets.

The method comprising the steps of:
receiving, by the RLC layer functionality, data packets at an ingress RLC channel,
mapping, by the Adapt layer functionality, data packets received at the ingress RLC channel to an egress RLC channel in accordance with a mapping rule for destining then data packets while maintaining the specified QoS, and
transferring, by the RLC layer functionality, the mapped data packets at the egress RLC channel.

Considering that various QoS requirements are supported by different RLC channels, the present disclosure, for maintaining a specified QoS end-to-end in the communication, provides to perform the relay functionality of a UE operating in an E2E multi-hop sidelink radio communication by the RLC layer functionality or RLC sub-layer of the UE. That is, when data packets are transferred at a UE operating as a relay UE in an E2E multi-hop sidelink, a mapping rule is applied to map E2E UE QoS at RLC channel level, thereby ensuring that the required E2E QoS in the E2E multi-hop sidelink is maintained.

To this end, the Adapt layer functionality or Adapt sub-layer above the RLC layer functionality performs mapping between RLC channels. That is, from ingress RLC channels receiving data packets to egress RLC channels for transferring the data packets, according to a mapping rule available to the Adapt layer functionality.

The method according to the present disclosure is implemented in each intermediate hop of the E2E multi-hop sidelink. The mapping rule may differentiate between data packets having various QoS requirements, and have the data packets mapped to different egress RLC channels capable of meeting respective QoS requirements of the data packets. The present method therefore allows a multi-hop relay function with QoS differentiation.

The method according to the present disclosure ensures a specified end-to-end QoS in each UE involved in any one of in-network coverage, out-of-network coverage, and partial network coverage.

Moreover, the mapping in accordance with the mapping rule is further performed to ensure that the data packets are routed to a correct next link or hop in the communication. This is to support efficiency of communication, by ensuring smooth communication between nodes.

In an embodiment of the present disclosure, the protocol stack of the UE is arranged for supporting data packet transfer in accordance with at least one of a PC5 interface protocol and a Uu interface protocol, the PC5 interface protocol arranged for transferring data packets with a further UE, and the Uu interface protocol arranged for transferring data packets with a Radio Access Network, RAN, unit, wherein the mapping in accordance with the mapping rule, in addition to the E2E based QoS and destination mapping, comprises protocol conversion between the PC5 interface protocol and the Uu interface protocol.

That is, in the case of a UE-Network relay architecture, E2E multi-hop sidelink employs the Uu interface protocol for communication between the UE and a base station function such as a gNB, or in general a RAN unit, and employs the PC5 for communication between UEs. To properly forward the data packets from a UE to the base station function, or vice versa, the mapping rule comprises a protocol conversion from PC5 to Uu, or vice versa. The protocol conversion in the UE functioning as a relay UE with the RAN unit thus supports transferring of the data packets further along the E2E multi-hop sidelink.

In an embodiment of the present disclosure, the protocol stack comprises at least one of a first protocol stack and a second protocol stack, the first protocol stack arranged for supporting the PC5 interface protocol, the second protocol stack arranged for supporting either one of the Uu interface protocol and the PC5 interface protocol, wherein the Adapt layer functionality operates both the first and second protocol stack.

A UE operating in a multi-hop radio communication, might have to communicate with both the RAN unit or base station function, and another UE involved in the communication. Hence, it is advantageous that the protocol stack of the UE includes two protocol stacks that may be configured to support communication with the base station function and the other UEs, respectively. Advantageously, the Adapt layer functionality may operate both the first and second protocol stacks. However, each protocol stack may comprise a separate or dedicated Adapt layer functionality or Adapt sub-layer, and such that both Adapt sub-layers co-operate for protocol conversion purposes, for example.

In an embodiment of the present disclosure, wherein the protocol stack is arranged for providing Packet Data Convergence Protocol, PDCP, layer functionality and Service Data Adaptation Protocol, SDAP, layer functionality, the method further comprising transferring, by the RLC layer functionality, to the PDCP/SDAP layer functionality, received data packets destined for the UE.

That is, in addition to ensuring that the data packets are transferred to the correct next hop or a further hop along the sidelinke, this embodiment of the method according to the present disclosure also provides the relay UE to transfer data destined to itself directly to the upper radio bearer layers of the UE.

In an embodiment of the present disclosure,
a first number of ingress RLC channels is allocated for mapping to a first number of egress RLC channels data packets destined for an immediate child UE,
a second number of ingress RLC channel is allocated for mapping to a second number of egress RLC channels data packets destined for a further UE not being the immediate child UE, and
a third number of ingress RLC channels is allocated for transferring to the PDCP/SDAP layer functionality data packets destined for the UE.

The above embodiment provides a specific mapping rule that allocates groups of RLC ingress to groups of RLC egress channels, based on the destination of the data packets. This allows the Adapt layer to transfer the received data packets to the right egress RLC channels for correctly routing the data packets. This mapping rule is straightforward and is to be implemented easily without incurring extra signalling or processing overhead.

In another embodiment of the present disclosure, the mapping in accordance with the mapping rule is based on information of QoS requirements and destinations comprised in the data packets.

This embodiment relies on information provided by the data packets to decide how the mapping can be performed such that a required end-to-end QoS is met, and the data packets are correctly routed.

In an embodiment of the present disclosure, the mapping in accordance with the mapping rule comprises one of:
mapping data packets received at an ingress RLC channel to an egress RLC channel supporting similar QoS;
mapping data packets received at an ingress RLC channel to an egress RLC channel at least supporting the required QoS;
mapping data packets received at an ingress RLC channel to an egress RLC channel having similar RLC channel configurations, and
mapping data packets received at an ingress RLC channel to an egress RLC channel in accordance with momentary data exchange conditions of an egress RLC channel.

In terms of ensuring the specified QoS of the data packets, various preconfigured mapping rules may be used, taking the channel conditions or channel configurations into consideration. Mapping in this manner ensures that the data packets are mapped to egress RLC channels meeting the minimum QoS requirements of the data packets. The mapping may also be determined in real time, based on an instantaneous network or traffic condition, for example, by checking the momentary data exchange conditions of an egress RLC channel.

When mapping based on similar RLC channel configurations of the ingress and egress RLC channels, in an embodiment of the present disclosure, the RLC channel configurations comprise at least one of:
- RLC mode including Acknowledged Mode (AM), Unacknowledged Mode (UM), and parameters of Transparent Mode (TM), RLC window size, length of RLC Sequence Number field;
- Hybrid automatic repeat request, HARQ, including blind retransmission and retransmission based on feedback;
- priority level, and
- prioritized bit rate.

Depending on the specified QoS requirements of the UE, different configurations may be used as criteria for selecting the correct RLC channel configurations. This allows various aspects of the QoS requirements to be considered, including latency, priority, and reliability when performing the mapping.

In an embodiment of the present disclosure, the mapping in accordance with the mapping rule comprises mapping from a high priority level ingress RLC channel to one of a set of high priority level egress RLC channels, having a momentary data exchange congestion level less than a specified threshold level.

When priority level is considered in performing the mapping, depending on the network condition, there may be more than one egress RLC channel meeting the required priority level, in particular if the data exchange congestion in the egress RLC channels is overall low. This allows a greater mapping flexibility and may help to better maintain the specified or required QoS of the data packets in the multi-hop sidelink radio communication.

In an embodiment of the present disclosure, the mapping rule is at least one of:
- preconfigured in the Adapt layer functionality;
- configured in the Adapt layer functionality when the E2E multi-hop sidelink radio communication is established, and
- configured in the Adapt layer functionality by a service requesting transfer of data packets requiring a specified QoS.

The above disclosed options of configuring the mapping rule in the Adapt layer functionality allows flexibility, such that a suitable option may be even dynamically selected depending on specific application scenarios and changes that may occur in the multi-hop relay communication, for example.

In an embodiment of the present disclosure, for configuring the mapping rule when E2E multi-hop sidelink radio communication is established, the mapping rule is configured in the Adapt layer functionality by signalling messages from one of a RAN unit and a master UE in the E2E multi-hop sidelink radio communication, in particular by Radio Resource Control, RRC, signaling messages.

Depending on the network architecture, either the RAN unit in communication with the remote UE over the E2E multi-hop sidelink, or another UE involved in the multi-hop sidelink radio communication and functioning as a master UE may configure other UEs involved in the E2E communication. The mapping rule can be easily transferred to each UE to be configured using RRC signalling, for example.

In an embodiment of the present disclosure, the mapping rule may be updated or reconfigured depending on a data packets exchange condition of the E2E multi-hop sidelink radio communication.

A person skilled in the art will appreciate that by updating or reconfiguring a mapping rule based on network conditions, such as network topology change due to UE mobility, intermediate UE radio link failure, and volume of data being exchanged over the E2E multi-hop sidelink, allows the QoS requirements to be maintained more reliably, and the routing of the data packets to be adapted as necessary regarding network conditions.

A second aspect of the present disclosure provides a User Equipment, UE comprising at least one processor and radio transceiver equipment, arranged for performing transfer of data packets requiring a specified Quality of Service, QoS, in an end-to-end, E2E, multi-hop sidelink radio communication in accordance with the above first aspect of the present disclosure.

Such a UE advantageously supports transfer of data packets over the E2E multi-hop sidelink, ensuring the specified QoS of the data packets and correctly routing the data packets to a next hop or to a further hop along the sidelink.

A third aspect of the present disclosure provides a method performed by a Radio Access Network, RAN, unit, comprising a processor operated protocol stack having an ingress and egress, the protocol stack at least arranged for providing Physical, PHY, layer functionality, Media Access Control, MAC, layer functionality, Radio Link Control, RLC, layer functionality, Adaptation, Adapt, layer functionality, Packet Data Convergence Protocol, PDCP, layer functionality, and Service Data Adaptation Protocol, SDAP, layer functionality, the RLC layer functionality providing a plurality of ingress and egress RLC channels for transferring data packets, and the Adapt layer functionality comprising a mapping rule for configuring Adapt layer functionality of a User Equipment, UE, for performing transfer of data packets requiring a specified Quality of Service, QoS, in an end-to-end, E2E, multi-hop sidelink radio communication destining the data packets while maintaining the specified QoS.

The method comprising the step of configuring the Adapt layer functionality of the UE based on the mapping rule comprised by the Adapt layer functionality of the RAN unit, by transferring signaling messages from the RAN unit to the UE, in particular by Radio Resource Control, RRC, signaling messages.

The above method performed by the RAN unit operates to configure other communication nodes, that is, UEs involved in the E2E multi-hop sidelink radio communication, such that the specified QoS of the data packets is maintained and the data packets are routed correctly.

A fourth aspect of the present disclosure provides a Radio Access Network, RAN, unit, comprising at least one processor and radio transceiver equipment, arranged for configuring Adapt layer functionality of a User Equipment, UE, for performing transfer of data packets requiring a specified Quality of Service, QoS, in an end-to-end, E2E, multi-hop sidelink radio communication, in accordance with the third aspect of the present disclosure.

A fifth aspect of the present disclosure provides a computer program product comprising program code stored on a computer readable medium, the program code arranged for performing the method according to the first aspect of the present disclosure, when the program code is executed by at least one processor of a UE.

A sixth aspect of the present disclosure provides a computer program product comprising program code stored on a computer readable medium, the program code arranged for performing the method according to the third aspect of the present disclosure, when the program code is executed by at least one processor of a Radio Access Network, RAN, unit.

The above disclosed and other aspects of the present disclosure will be apparent from and elucidated with reference to the non-limitative example embodiment(s) described hereinafter.

DETAILED DESCRIPTION

The present disclosure is detailed below with reference to multi-hop relay networks comprising two intermediate communication nodes or relay nodes in between a source communication node and a destination communication node. Those skilled in the art will appreciate that the present disclosure is not limited to a multi-hop relay network communication with just two relay nodes, but is applicable for communication with any number of communication nodes involved in the multi-hop relay network communication.

In the following description and the claims, the terms "relay", "relay node", "relay UE", "intermediate node", and "intermediate UE" are used interchangeably. The terms "data packet", "packet" and "traffic" are used interchangeably.

The present disclosure proposes a method of performing transfer of data packets requiring a specified Quality of Service, QoS, by a User Equipment, UE, in an end-to-end, E2E, multi-hop sidelink radio communication. The E2E multi-hop sidelink is formed between a source communication node and a destination communication node. One of the source and destination communication node is a remote UE having no network coverage, hence there is no direct communication between the remote UE and the other end of the multi-hop side link, being either a base station function such as a gNB or another UE sending or receiving traffic or data packets to or from the remote UE. The method of the present disclosure therefore is applicable to two different types of multi-hop relay network architectures, the first one being a UE-Network relay network, and the second one being a UE-UE relay network.

In between the source and destination communication node, there is at least one UE functioning as an intermediate or relay node for transferring traffic or data packets between the source and destination node. For a UE-Network relay network architecture with more than one relay UEs between the base station function such as a gNB and the remote UE, the first relay UE immediately next to the gNB will be in the coverage area of gNB and the rest of the relays UEs will not be in the coverage area of the gNB.

Figure 3:
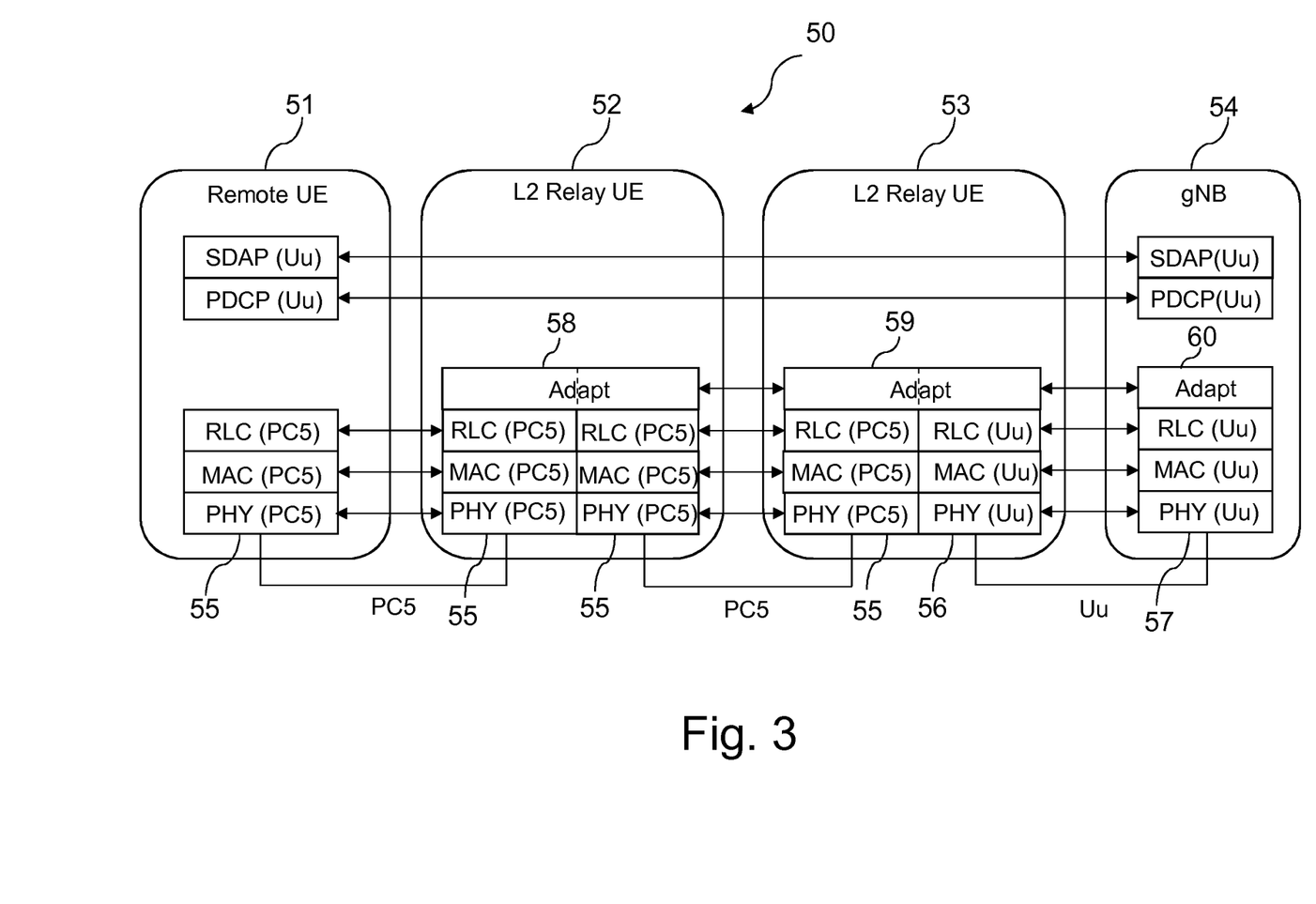
FIG. 3 schematically illustrates a protocol architecture of a multi-hop UE-Network relay architecture comprising a remote UE, two intermediate or relay UEs and a RAN unit, in accordance with the present disclosure.

FIG. 3 schematically illustrates a UE-Network relay architecture 50 comprising a remote UE 51, two intermediate UEs functioning as relay UEs 52, 53 and a base station function gNB 54. An E2E multi-hop radio sidelink communication is established between the remote UE 51 and the base station function 54, over which traffic or data packets requiring a specified QoS are transferred from the remote UE 51 to the gNB 54 or vice versa, via the relay UEs 52, 53.

Each communication node including the remote UE 51, the relay UEs 52, 53 and the base station function 54 may comprise a protocol stack 55, 56, 57, having at least a Physical, PHY, layer functionality, a Media Access Control, MAC, layer functionality, and a Radio Link Control, RLC layer functionality. For forwarding traffic to or from the remote UE 51, the relay UEs 52, 53 will use only the RLC/MAC/PHY layer functionalities.

Each protocol stack 55, 56 of the relay UEs 52, 53 has an ingress and egress. Logically the protocol stack 55, 56 may be considered as having two protocol stacks each arranged for communication in accordance with an interface protocol, where one protocol stack functions as ingress interface for receiving data packets and the other protocol stack functions as egress interface for transmitting data packets. In the case of the UE-Network relay architecture as illustrated in FIG. 3, a first relay UE 53 in the downstream direction employs a Uu interface for communication with the base station function 54, whereas it uses a PC5 interface for communication with the remote UE 51 and optionally other relay UEs 52. In the case of a UE-UE relay architecture, the relay UE employs just the PC5 interface for communication with both the source and destination UE.

Furthermore, unlike the first relay UE 53 in the downstream direction, the other relay UEs, for example a second relay UE 52 in the downstream direction, will use only PC5 interface for communication with their parent relay UE 53 and child relay UE or remote UE 51.

Moreover, each node is configured with a new protocol layer 58, 59, 60 named Adaptation layer, Adapt for short, above the RLC layer. The Adapt layer 58, 59 of a relay node 52, 53 acts as a link or bridge between protocol stacks 55, 56, 57 and functions to perform mapping between RLC channels. Specifically, for downstream traffic from the base station function 54 to the remote UE 51, the relay node 53 performs a protocol conversion to map ingress Uu RLC channels to egress PC5 RLC channels. As for upstream traffic, the protocol conversion is from PC5 to Uu. The Adapt layer 58, 59 will perform mapping between ingress PC5 RLC channels to egress PC5 RLC channels between relay UEs 52, 53.

The mapping as described above therefore may comprise a protocol conversion and is performed in accordance with a mapping rule which ensures that QoS requirements of the traffic carried by these RLC channels are maintained. Moreover, the mapping performs according to the mapping rule allows the relay UE 52, 53 to correctly route the traffic or data packets being transferred to the destination node via proper relay nodes.

It can be contemplated that two Adapt layers may be respectively configured above the Uu RLC layer and the PC5 RLC layer for supporting the protocol conversion from Uu to PC5 or vice versa, which is illustrated as a broken line respectively shown in the Adapt layers 58, 59 in FIG. 3.

The protocol stack of the remote UE 51 and the base station function gNB 54 further comprises a Packet Data Convergence Protocol, PDCP, layer functionality and Service Data Adaptation Protocol, SDAP, layer functionality. These upper layers of the remote UE 51 have an end-to-end connection with the PDCP and SDAP layers of the base station function gNB 54, which means that the PDCP in the remote UE 51 are configured for the Uu interface only. However, as mentioned above the radio interface can be both the Uu and PC5. Thus, it is the responsibility of the Adapt layer 58, 59 to perform or provide the functions/services not supported by the PDCP (configured for Uu interface) but expected from PDCP (configured for PC5), i.e., the Adapt layer 58, 59 act as a bridge between the PDCP for the Uu interface and lower layer protocols for the PC5.

The mapping rule is configured in the Adapt layer 58, 59, 60 for each node in the UE-Network relay network 50. It can either be pre-configured at each network node or configured by the network. As an example, the mapping rule may be configured when the node joins the network, when the multi-hop sidelink is established or when a new service arrives which requests a new end-to-end radio bearer configuration. A mapping rule configured in the Adapt layer 58, 59, 60 can also be updated or reconfigured per requirements depending on the network conditions.

The mapping rule may be configured by for example a Radio Access Network, RAN unit such as the gNB 54, and forwarded to the remote UE 51 by the relay UEs 52, 53, for example, using Radio Resource Control, RRC, signalling.

In a specific example where the mapping rule is network configured, it is first configured at layer two, L2, of a relay UE 52, 53 by the gNB via Uu RRC signalling. The mapping rule can be transmitted to the remote UE 51 by L2 of the relay UE 52, 53 during the UE sidelink discovery phase. In this case, the QoS mapping rule is transmitted in the sidelink RRC message from L2 of the relay UE 52, 53 to Remote UE 51 during the sidelink discovery phase.

For the UE-Network relay network architecture 50, the gNB involved in the E2E sidelink radio communication will have a general picture of the whole network 50 and all the UEs including the relay UEs 52, 53 and the remote UE 51, the mapping rule configured in the Adapt layer 60 of the source node 54 will therefore be a bit different or more complex from the mapping rule configured in the relay UEs 52, 53.

The mapping rule is applied by the Adapt layer 58, 59 of a relay UE 52, 53 such that the QoS requirements of the data packets transferred by the relay UE 52, 53 from a source communication node to a destination communication node may be maintained, and that the data packets are relayed or forwarded correctly. In this sense, the mapping rule serves two purposes, that is ensuring the required QoS and correctly routing the data packets.

The mapping rule will be detailed below in connection with the description of the method of the present disclosure.

Figure 4:
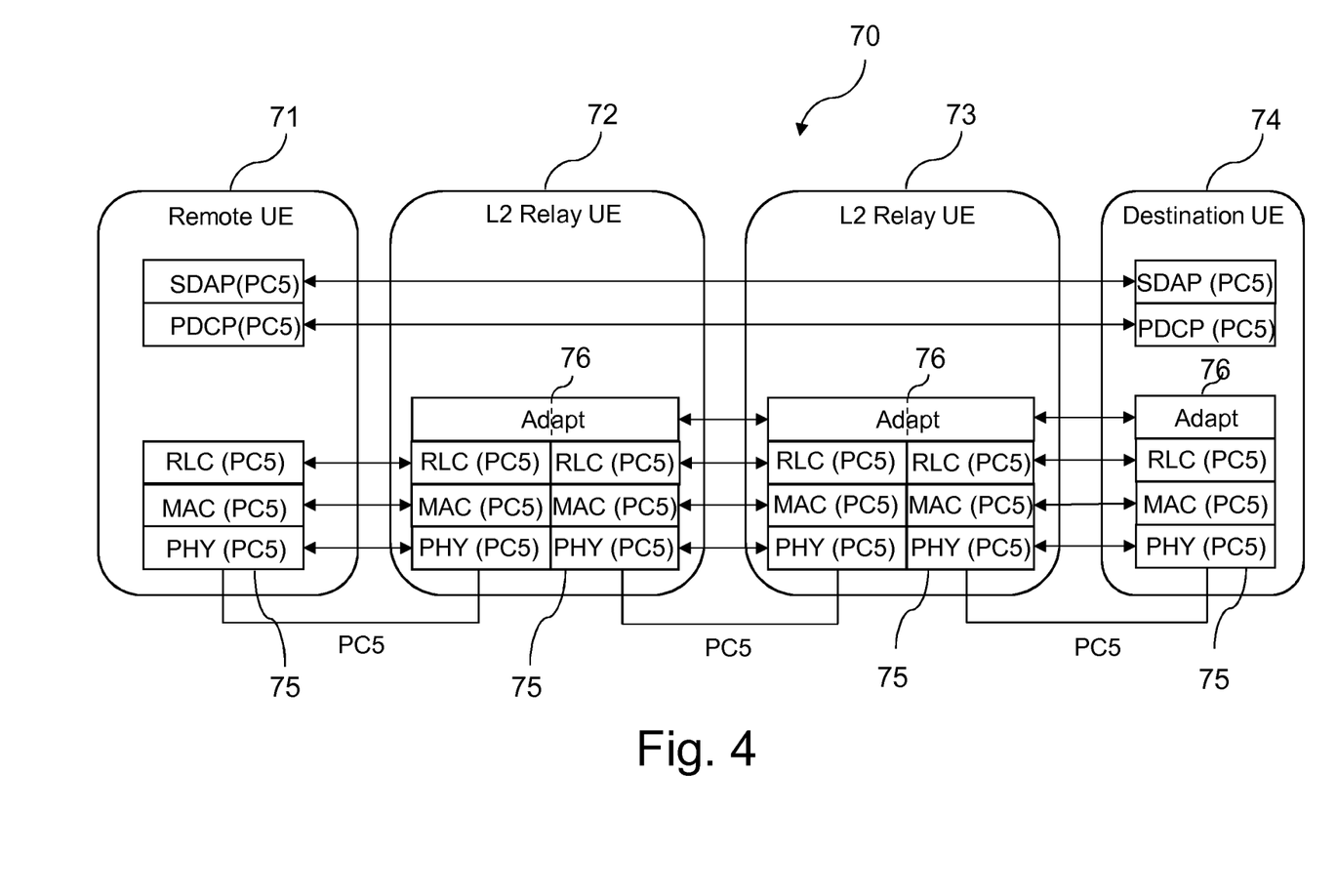
FIG. 4 schematically illustrates a protocol architecture of an end-to-end multi-hop UE-UE relay architecture comprising two end UEs, and two intermediate or relay UEs, in accordance with the present disclosure.

FIG. 4 schematically illustrates a UE-UE relay architecture 70. The UE-UE relay architecture 70 differs from the UE-network relay architecture 50 illustrated in FIG. 3 in that the E2E multi-hop sidelink is established between a source UE 71 and a destination UE 74, with one or more intermediate UEs 72, 73 in between.

Therefore, the protocol stack 75 of the UEs 71, 72, 73, 74 comprises protocol layers operating in accordance with on the PC5 interface. The Adapt layer 76 in the relay UEs 72, 73 are arranged to perform mapping between ingress and egress PC5 interface.

Under the UE-UE relay architecture 70, one of the UEs 71, 72, 73, 74 may act as a master UE that functions to configure Adapt layers 76 of the other UEs in the multiple hop path. The master UE maintains the PC5 control plane, CP, with other UEs. The mapping rules are sent via PC5-RRC message, hop by hop, to the destined UE.

Figure 5:
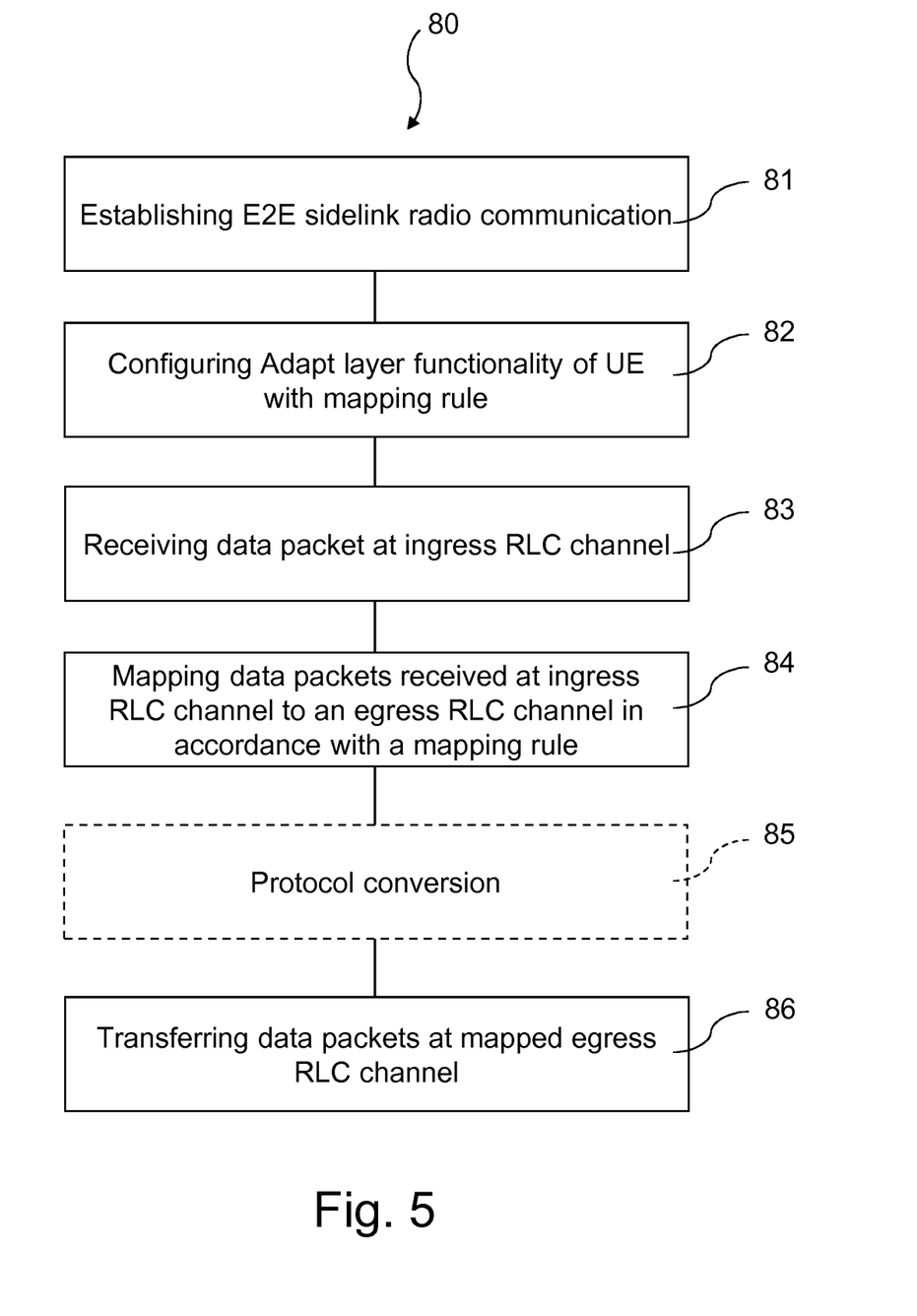
FIG. 5 illustrates, in a simplified flow diagram, a method of performing transfer of data packets requiring a specified QoS by a UE in an end-to-end, E2E, multi-hop sidelink radio communication, in accordance with the present disclosure.

FIG. 5 illustrates, in a simplified flow diagram, steps of a method 80 of performing transfer of data packets requiring a specified QoS by a UE in an E2E multi-hop sidelink radio communication. The sidelink may be established between a UE and a RAN unit in the UE-network relay architecture 50 as illustrated in FIG. 3, or between two UEs in the UE-UE relay architecture 70 as illustrated in FIG. 4.

To start with, when direct communication between a remote UE having no network coverage and a further UE or the RAN unit is needed, at step 81, "Establishing E2E sidelink radio communication", an E2E sidelink between a source node and a destination node is established for transferring of data packets over the same.

Next, at step 82, "Configuring Adapt layer functionality of UE with mapping rule", Adapt layers of all nodes, including all UEs and possibly an RAN unit such as a gNB, involved in the radio communication over the E2E sidelink are configured with a mapping rule as described above with reference to FIGS. 3 and 4.

Note that the mapping rule may also be configured in the Adapt layers of the nodes involved in the E2E sidelink radio communication when the E2E sidelink is established, depending on the specific application scenario.

At step 83, "Receiving data packet at ingress RLC channel", when the radio communication starts, a UE functioning as a relay UE between the source node and the destination node receives data packets at an ingress RLC channel of its protocol stack.

Following this step, at step 84, "Mapping data packets received at ingress RLC channel to an egress RLC channel in accordance with a mapping rule", the adapt layer functionality of the relay UE maps the data packets received at the ingress RLC channel to an egress RLC channel in accordance with a mapping rule for destining the data packets while maintaining the specified QoS of the data packets.

In the case that the relay UE is transferring the data packets in the UE-network relay architecture 50 as illustrated in FIG. 3, at step 85, "Protocol conversion", the relay UE immediately next to the RAN unit of the network performs a protocol conversion, to convert an ingress Uu RLC channel for communicating with the RAN unit to an egress PC5 RLC channel for communicating with a next hop UE, or vice versa.

The mapping serves two purposes, that is, correctly routing the data packets and maintaining the specified QoS of the data packets. Both purposes are realised by adopting a properly configured mapping rule.

With regard to the routing of the data packets, the mapping rule depends on the destination of the data packets. Whenever the relay UE receives a data packet, the first thing that the relay UE does is to check the destination of the data packet, which can be done in several ways.

As an example, a simple approach may be to use specific preconfigured ingress RLC channels for indicating the destination of the data packet. That is, a group of ingress RLC channels is allocated for traffic or data packets that are intended to be forwarded to UEs other than the relay UE, such as a next hop relay UE or the remote UE, while a number of ingress RLC channels is allocated only for traffic or data packets destined for the relay UE itself.

Of the group of ingress RLC channels allocated for forwarding data packets, a first number of RLC channels is allocated for mapping data packets destined for an immediate child UE to a first number of egress RLC channels, while a second number of ingress RLC channel is allocated for mapping data packets destined for a further child UE not being said immediate child UE to a second number of egress RLC channels. A child UE of a UE as used herein refers to a UE for receiving data packets from the UE. Specifically, an immediate child UE of a UE refers to an immediate next hop UE that directly receive data packets from the UE, while a further child UE refers to a UE further down the link that does not receive data packet directly from the UE, but from another UE between the UE and the further child UE.

Based on this mapping rule, RLC channels, at both the Uu and PC5 interfaces, preconfigured for carrying relay UE own traffic will pass the data packet received by themselves to their associated PDCP entities, or radio bearer, while the rest of the RLC channels will pass the receive data packet to the respective Adapt layer.

The Adapt layer functionality will map the data packet received on ingress RLC channels for forwarding or relaying data packets to proper egress RLC channels. For example, if the data packet is intended for the immediate connected child UE, the Adapt layer will map the data to egress RLC channel(s) allocated for the child UE own traffic. However, if the data packet or traffic is not intended for the immediate connected child UE but for other UE further down along the downstream path, the Adapt layer will map the data packet or traffic to egress RLC channel assigned for the purpose of forwarding data.

Alternatively, the data packet itself may carry information of the destination of the data packet. The relay UE, upon receiving the data packet, may obtain the destination from the data packet, and then route the data packet accordingly.

It is also possible for the relay UE to determine a proper route for the received data packet dynamically, based on momentary network conditions, such as data being transferred at different channels, network topology change due to UE mobility, intermediate UE radio link failure, and the like.

As for maintaining the specified QoS of the data packets, the mapping rule may follow a number of general principles.

As a first exemplary embodiment, when a data packet is transferred over the E2E multi-hop sidelink in either a UE-NW relay network or UE-UE relay network, an E2E QoS performance is ensured by using Uu/PC5 RLC channels of similar QoS characteristic in each hop. Similar QoS characteristic may be based on for example priority, prioritized data rate, latency and so on. Note that the first UE node in a downstream UE-NW relay will have Uu RLC channel connected to the RAN unit and PC5 RLC channel connected to the next UE hop. Otherwise, a UE node has PC5 RLC channel for both ingress and egress.

As an alternative embodiment, each hop in the E2E multi-hope sidelink should adopt a similar Uu/PC5 RLC channel configuration to ensure E2E QoS. For example, the egress RLC channel used for transferring a same data packet should have same or similar configuration, in terms of various factors, as the ingress RLC channel receiving the data packet.

The factors may comprises the RLC mode, including Acknowledged Mode, AM, Unacknowledged Mode, UM, and Transparent Mode, TM. Another factor may be related parameters such as RLC window size or length of RLC Sequence Number field. Hybrid automatic repeat request, HARQ configuration relating to duplication of the data packet may also be considered, such as blind retransmission or retransmission based on feedback, or maximum allowed retransmission attempts. In choosing similar channels, priority and prioritized Bit Rate of the data packet can also be considered.

For the priority mapping rule, one embodiment of the mapping rule configured at the Adapt layer of the relay UE can be that a high priority ingress RLC channel can be mapped to one of a set of high priority egress RLC channels. Another embodiment can be that a high priority ingress RLC channel can be mapped to one of a set of high priority egress RLC channels, if the traffic congestion level of the selected RLC channel is less than a threshold. Still another embodiment of the mapping rule for the Adapt layer at the relay UE can be that high priority ingress RLC channel can be probabilistic mapped to one of a set of high priority egress RLC channels, where the probability of selecting a given high priority egress RLC channel is inverse proportional to the traffic congestion level at the given selected ingress RLC channel.

As discussed above, for the UE-network relay architecture, as the RAN unit has a general picture of the whole relay network, it will consider the QoS profile or requirements for the traffic or data packets carried by the UE bearers and then map the UE bearers to appropriate RLC channels. Furthermore, the RAN unit will decide what RLC channels should be used on the intermediate nodes or relay UEs for forwarding the UE bearers traffic. The RLC channel ID (i.e., LCID) can be employed for assigning priority level to each UE bearer traffic.

For the UE-network relay architecture as illustrated in FIG. 3, a set of exemplary mapping rules may be as follows. Note that the following mapping rule is based on an assumption that relay UE 53 of FIG. 3 is referred to as UE1 and relay UE 52 of FIG. 3 as UE2.

gNB Mapping Rule:
    LCID A1-A3→CP signalling for remote UE;
    LCID A4-A6→CP signalling for relay UE2;
    LCID A7-A9→CP signalling for relay UE1;
    LCID A10-A13→UP traffic (high priority) for remote UE;
    LCID A14-A17→UP traffic (high priority) for relay UE2;
    LCID A18-A21→UP traffic (high priority) for relay UE1;
    LCID A22-A25→UP traffic (low priority) for remote UE;
    LCID A26-A29→UP traffic (low priority) for relay UE2;
    LCID A30-A33→UP traffic (low priority) for relay UE1.

General Mapping Rule for UEs:
    Ingress LCID A7-A9→CP signalling messages for UE;
    Ingress LCID A18-A21→UP data for UE (from gNB);
    Ingress LCID A30-A33→UP data for UE (from gNB);
    Ingress LCID A37-A39→UP data for UE (from UE1);
    Ingress LCID A40-A42→UP data for UE (from UE2);
    Other LCIDs for forwarding CP/UP data.

Remote UE Mapping Rule:
    Ingress LCID A7-A9→Upper layers (RRC);
    Ingress LCID A18-A21→Upper layers (SDAP);
    Ingress LCID A30-A33→Upper layers (SDAP);
    Ingress LCID A37-A39→Upper layers (SDAP);
    Ingress LCID A40-A42→Upper layers (SDAP).

UE2 Mapping Rule:
    Ingress LCID A4-A6→Egress LCID A7-A9;
    Ingress LCID A7-A9→Upper layers of UE2;
    Ingress LCID A14-A17→Egress LCID A18-A21;
    Ingress LCID A18-A21→Upper layers of UE2;

Ingress LCID A22-A25→Egress LCID A26-A29;
Ingress LCID A30-A33→Upper layers of UE2;
Ingress LCID A34-36→Egress LCID A37-39;
Ingress LCID A37-39→Upper layers of UE2;
Egress LCID A40-42→UE2 data for UE1.

UE1 Mapping Rule:
Ingress LCID A1-A3→Egress LCID A4-A6;
Ingress LCID A4-A6→Egress LCID A7-A9;
Ingress LCID A7-A9→Upper layers of UE1;
Ingress LCID A10-A13→Egress LCID A14-A17;
Ingress LCID A14-A17→Egress LCID A18-A21;
Ingress LCID A18-A21→Upper layers of UE1;
Ingress LCID A22-A25→Egress LCID A26-A29;
Ingress LCID A26-A29→Egress LCID A30-A33;
Ingress LCID A30-A33→Upper layers of UE1;
Egress LCID A34-36→UE1 data for remote UE;
Egress LCID A37-39→UE1 data for UE2.

The above mapping rules are described in detail in the following.

The above mapping rules allow a UE bearer traffic with high QoS requirements to be assigned with an LCID with lower value or number (e.g. 3 or 4) compared to a UE bearer traffic with relatively low QoS requirements (e.g. LCID equals to 8 or 9).

Based on the above mapping rule, the gNB configures the mapping rule in the Adapt layer of all the relay and remote UEs. The configuration of the source node (gNB) Adapt generally follows the following criteria:

In general, CP signalling for the UEs are assigned highest priority, i.e., LCIDs A1-A9 Uu RLC channels.

Among the Uu LCIDs for CP signalling, the top LCIDs (i.e., A1-A3) are assigned to the far most (i.e., Remote UE) UE follow by the next far most (i.e., A4-A6 are assigned to UE2) relay UE and so on.

The high priority user plane (UP) data or traffic from/to the source to/from UEs (including the remote and relay UEs) are assigned next level of LCIDs, i.e., A10-A21 RLC channels.

Again, like CP case, the top LCIDs (i.e., A10-A13) in the band of A10-A21 are assigned to the far most (i.e., remote UE) UE follow by the next far most (i.e., A14-A17 are assigned to UE2) relay UE and so on.

The low priority user plane (UP) data or traffic from/to the source to/from the UEs (including the remote and relay UEs) are assigned next level of LCIDs, i.e., A22-A33 RLC channels.

Again, like high priority UP band, the top LCIDs (i.e., A22-A25) in the band of A22-A33 are assigned to the far most (i.e., remote UE) UE follow by the next far most (i.e., A26-A29 are assigned to UE2) relay UE and so on.

The next band (in terms of priority level) of LCIDs, i.e., LCID 34-42 will be allocated or configured for inter-UE communication.

Within the inter-UE communication band of LCIDs (i.e., LCID 34-42), the top LCIDs (i.e., A34-A36) will be assigned or allocated to the closest relay UE (i.e., relay UE1) to the source node (gNB) for communication with the far most UE (i.e., remote UE) from the source node and the next group (in terms of priority) of LCIDs (i.e., A37-A39) for communication with the second far most UE (relay UE1) and so on. This sub bands (i.e., A34-A36, and A37-A39) can be further subdivided into control plane signalling and data traffic.

Alternatively, in a variant of the embodiment, the intermediate nodes or relay UEs can change the egress RLC channels within a given subset of channels allocated for the type of traffic. For example, according to the above mapping rule, the relay UE1 will map ingress RLC channel 10, 11, 12, 13 to egress RLC channel 14, 15, 16, 17, respectively. However, if the relay UE1 receives data on RLC channel 11 but no data on RLC channel 10, i.e., the RLC channel is temporarily not in use, then the relay UE1 can map the data received at ingress RLC channel 11 to egress RLC channel 14 instead of the default egress RLC channel 15. In other words, the relay UEs can upgrade the priority level of the traffic if there is no data/traffic over the high priority RLC channels.

Similarly, the RAN unit will configure the Adapt layer of the relay UEs in such a way that a relay UE will know which egress RLC channels carry data for itself and which egress RLC channels carry inter-UE data for other UEs in the network. For example, the RAN unit will configure the Adapt of these relay UEs to forward CP traffic received on LCIDs A7-A9 and remap and then forward CP traffic received on LCID A1-A6, as explained below:

When a relay UE receives data packet(s) over LCID A7-A9, the UE will forward the data packet(s) to its upper layer based on the configured mapping rules.

On the other hand, when a relay UE receives packet(s) over LCID A4-A6, the UE will know that the packet(s) should be remapped to egress LCID A7-A9 and forwarded to the next relay.

Similarly, when a relay UE receives data packet(s) over LCID A1-A3, the UE will know that the data packet(s) should be remapped to egress LCID A4-A6 and forwarded to the next relay.

For the QoS mapping rule, the source node, either the remote UE or the gNB, can map one UE bearer to one RLC channel, i.e., 1:1 mapping. Alternatively, the source node can map a number of N UE bearers, targeting the same destination node, to one RLC channel, i.e., N:1 mapping. 1:1 mapping is useful when it is desirable to provide high granularity QoS treatment at each individual UE bearer level, while N:1 mapping is useful when it is desirable to have coarse granularity QoS treatment at aggregated UE bearers' level.

At intermediate relay node, 1:N bearer mapping is also possible, i.e., one ingress RLC channel of aggregated UE bearers can be remapped to multiple egress RLC channels where each RLC channel corresponds to one UE bearer. In this case, flexible switch from coarse granularity to high granularity QoS provisioning is enabled. However, in case of N:1 mapping the parent relay UE (for example, relay UE2 which serves as parent relay for remote UE) will need to perform 1:N mapping in order to split the traffic back to 1:1 bearer, since there is no Adapt in the remote UE to carry out this splitting.

The method of the present disclosure also comprises step 86, "Transferring data packets at mapped egress RLC channel". The data packet thus transferred is ensured with the required QoS and forwarded to the next hop.

Figure 6:
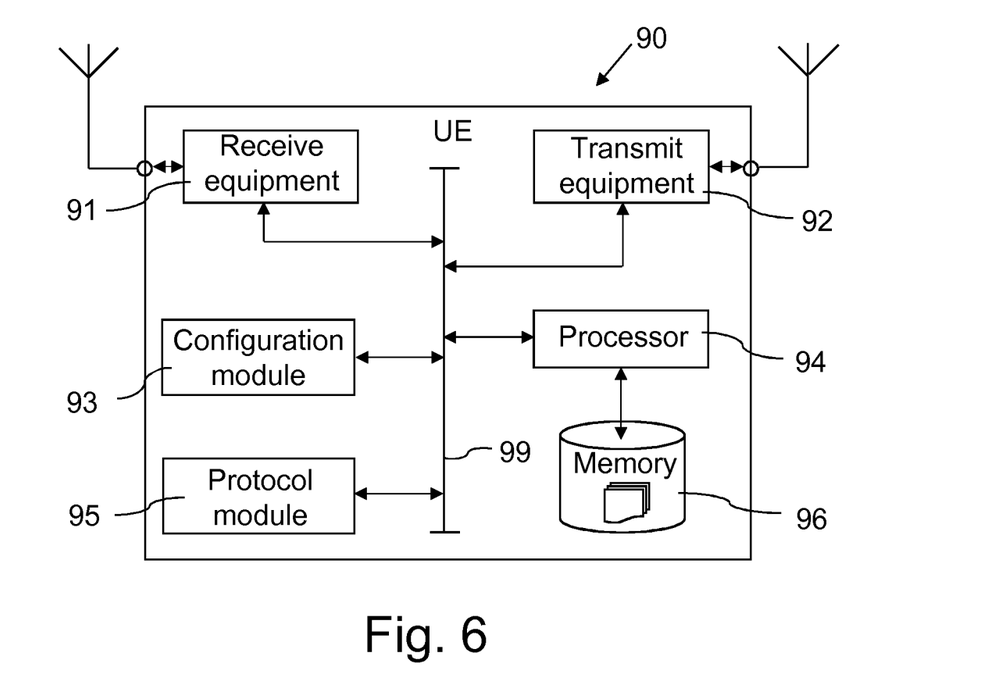
FIG. 6 schematically illustrates a UE in accordance with an embodiment of the present disclosure.

FIG. 6 schematically illustrates a UE 90 in accordance with an embodiment of the present disclosure. The UE 90 comprises a receive equipment 91 and a transmit equipment 92 respectively arranged for receiving and transmitting data packets to other communication nodes. The UE 90 comprises a configuration module 93 arranged for configuring a mapping rule as described above in other UEs involved in an E2E multi-hop sidelink communication. A protocol module 95 of the UE 60 is operated by a processor 94 to provide the protocol stack as described above. The UE 90 further comprises a memory 96 for storing at least the mapping rule for itself. The processor 95 may communicatively interact with and control different modules of the UE 90 via an internal data communication bus 99.

The UE 90 operates to perform transfer of data packets requiring a specified QoS in an E2E multi-hop sidelink radio communication in accordance with the above method 80.

Figure 7:
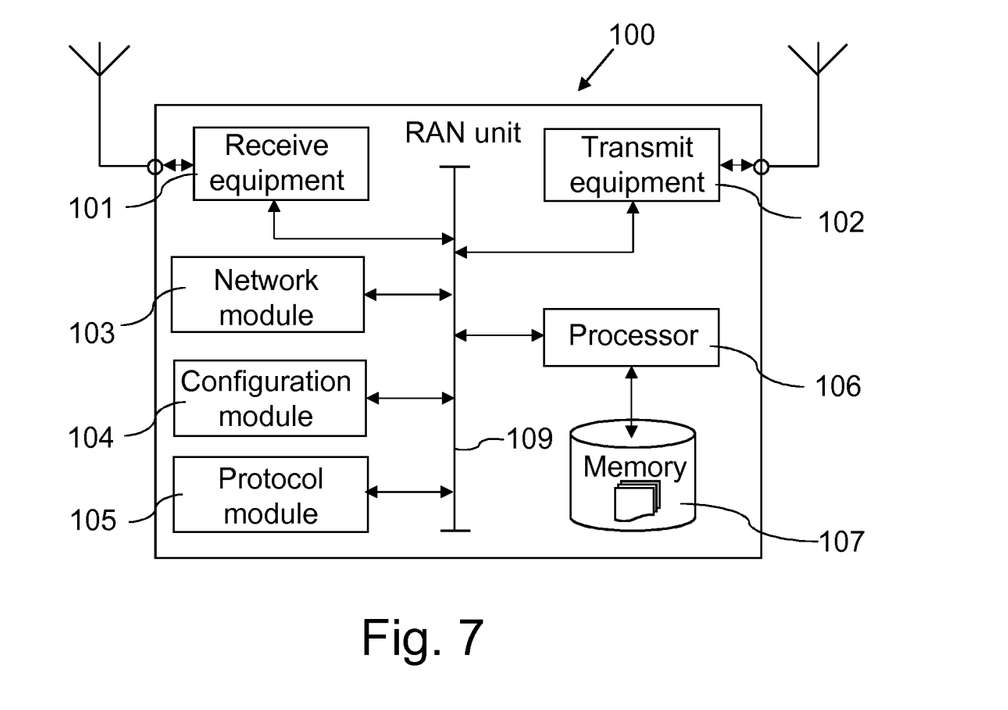
FIG. 7 schematically illustrates an RAN unit in accordance with an embodiment of the present disclosure.

FIG. 7 schematically illustrates an RAN unit 100 in accordance with an embodiment of the present disclosure. The RAN unit 100 comprises a receive equipment 101 and a transmit equipment 102 respectively arranged for receiving and transmitting data packets to other communication nodes. The RAN unit 100 comprises a configuration module 104 arranged for configuring a mapping rule as described above in Adapt layer functionality of the RAN unit 100 and other UEs involved in an E2E multi-hop sidelink communication. A protocol module 105 of the RAN unit 100 is operated by a processor 106 to provide the protocol stack as described above. The RAN unit 100 further comprises a memory 106 for storing mapping rules for itself and for other nodes. A network module 103 of the RAN unit is arranged for providing network access functionalities to UE devices connected to the RAN unit. The processor 106 may communicatively interact with and control different modules of the RAN unit 100 via an internal data communication bus 109.

The RAN unit 100 operates to perform transfer of data packets requiring a specified QoS in an E2E multi-hop sidelink radio communication in accordance with the above method 80 and to configure a mapping rule as described above in an Adapt layer functionality of UE nodes involved in the E2E multi-hop sidelink radio communication.

The present disclosure is not limited to the examples as disclosed above, and can be modified and enhanced by those skilled in the art beyond the scope of the present disclosure as disclosed in the appended claims without having to apply inventive skills and for use in any data communication, data exchange and data processing environment, system or network.

The invention claimed is:

1. A method of performing transfer of data packets requiring a specified Quality of Service (QOS) by a User Equipment (UE) in an end-to-end (E2E) multi-hop sidelink radio communication, said UE comprising a processor operated protocol stack having an ingress and egress, said protocol stack at least arranged for providing Physical (PHY) layer functionality, Media Access Control (MAC) layer functionality, Radio Link Control (RLC) layer functionality, and Adaptation (Adapt) layer functionality, said RLC layer functionality providing a plurality of ingress and egress RLC channels for transferring data packets, said method comprising:

receiving, by said RLC layer functionality, data packets at an ingress RLC channel;

mapping, by said Adapt layer functionality, data packets received at said ingress RLC channel to an egress RLC channel in accordance with a mapping rule, at RLC channel level, for destining said data packets while maintaining said specified QOS; and transferring, by said RLC layer functionality, said mapped data packets at said egress RLC channel;

wherein said mapping in accordance with said mapping rule comprises one of:

mapping data packets received at an ingress RLC channel to an egress RLC channel supporting similar QoS;

mapping data packets received at an ingress RLC channel to an egress RLC channel at least supporting said required QoS;

mapping data packets received at an ingress RLC channel to an egress RLC channel having similar RLC channel configurations; or mapping data packets received at an ingress RLC channel to an egress RLC channel in accordance with momentary data exchange conditions of an egress RLC channel.

2. The method according to claim 1, wherein said protocol stack of said UE is arranged for supporting data packet transfer in accordance with at least one of a PC5 interface protocol and a Uu interface protocol, said PC5 interface protocol arranged for transferring data packets with a further UE, and said Uu interface protocol arranged for transferring data packets with a Radio Access Network, RAN, unit, wherein said mapping in accordance with said mapping rule comprises protocol conversion between said PC5 interface protocol and said Uu interface protocol.

3. The method according to claim 2, wherein said protocol stack comprises at least one of a first protocol stack and a second protocol stack, said first protocol stack arranged for supporting said PC5 interface protocol, said second protocol stack arranged for supporting either one of said Uu interface protocol and said PC5 interface protocol, wherein said Adapt layer functionality operates both said first and second protocol stack.

4. The method according to claim 1, wherein said protocol stack is arranged for providing Packet Data Convergence Protocol (PDCP) layer functionality and Service Data Adaptation Protocol (SDAP) layer functionality, further comprising transferring, by said RLC layer functionality, to said PDCP/SDAP layer functionality, received data packets destined for said UE.

5. The method according to claim 4, wherein:

a first number of ingress RLC channels is allocated for mapping to a first number of egress RLC channels data packets destined for an immediate child UE, a second number of ingress RLC channel is allocated for mapping to a second number of egress RLC channels data packets destined for a further child UE not being said immediate child UE, and a third number of ingress RLC channels is allocated for transferring to said PDCP/SDAP layer functionality data packets destined for said UE.

6. The method according to claim 1, wherein said mapping in accordance with said mapping rule is based on information of QoS requirements and destinations comprised in said data packets.

7. The method according to claim 1, wherein said RLC channel configurations comprise at least one of:

RLC mode including Acknowledged Mode (AM), Unacknowledged Mode (UM), and Transparent Mode (TM), and parameters comprising RLC window size, length of RLC Sequence Number field;

Hybrid automatic repeat request (HARQ), including blind retransmission and retransmission based on feedback;

priority level; or prioritized bit rate.

8. The method according to claim 7, wherein said mapping in accordance with said mapping rule comprises mapping from a high priority level ingress RLC channel to one of a set of high priority level egress RLC channels having a momentary data exchange congestion level less than a specified threshold level.

9. The method according to claim 1, wherein said mapping rule is at least one of:

preconfigured in said Adapt layer functionality;

configured in said Adapt layer functionality when said E2E multi-hop sidelink radio communication is established; or configured in said Adapt layer functionality by a service requesting transfer of data packets requiring a specified QoS.

10. The method according to claim 9, wherein when said E2E multi-hop sidelink radio communication is established, said mapping rule is configured in said Adapt layer functionality by signalling messages from one of a RAN unit and a master UE in said E2E multi-hop sidelink radio communication, in particular by Radio Resource Control, RRC, signaling messages.

11. The method according to claim 1, wherein said mapping rule is updated or reconfigured depending on a data packets exchange condition of said E2E multi-hop sidelink radio communication.

12. A User Equipment (UE) comprising:
radio transceiver equipment; and
at least one processor operatively associated with the radio transceiver equipment and configured to operate a protocol stack having an ingress and egress;
wherein said protocol stack is arranged for providing Physical (PHY) layer functionality, Media Access Control (MAC) layer functionality, Radio Link Control (RLC) layer functionality, and Adaptation (Adapt) layer functionality, said RLC layer functionality providing a plurality of ingress and egress RLC channels for transferring data packets and wherein said at least one processor is configured to operate said protocol stack to:
receive, by said RLC layer functionality, data packets at an ingress RLC channel;
map, by said Adapt layer functionality, data packets received at said ingress RLC channel to an egress RLC channel in accordance with a mapping rule, at RLC channel level, for destining said data packets while maintaining said specified QoS; and
transfer, by said RLC layer functionality, said mapped data packets at said egress RLC channel; and
wherein said mapping in accordance with said mapping rule comprises one of:
mapping data packets received at an ingress RLC channel to an egress RLC channel supporting similar QoS;
mapping data packets received at an ingress RLC channel to an egress RLC channel at least supporting said required QoS;
mapping data packets received at an ingress RLC channel to an egress RLC channel having similar RLC channel configurations; or
mapping data packets received at an ingress RLC channel to an egress RLC channel in accordance with momentary data exchange conditions of an egress RLC channel.

13. A method, performed by a Radio Access Network (RAN) unit, the RAN unit comprising a processor operated protocol stack having an ingress and egress, said protocol stack at least arranged for providing Physical (PHY) layer functionality, Media Access Control (MAC) layer functionality, Radio Link Control (RLC) layer functionality, Adaptation (Adapt) layer functionality, Packet Data Convergence Protocol (PDCP) layer functionality, and Service Data Adaptation Protocol (SDAP) layer functionality, said RLC layer functionality providing a plurality of ingress and egress RLC channels for transferring data packets, and said Adapt layer functionality comprising a mapping rule for configuring Adapt layer functionality of a User Equipment (UE) for performing transfer of data packets requiring a specified Quality of Service (QOS) in an end-to-end (E2E) multi-hop sidelink radio communication destining said data packets while maintaining said specified QoS, said method comprising:
configuring said Adapt layer functionality of said UE based on said mapping rule, at RLC channel level, comprised by said Adapt layer functionality of said RAN unit, by transferring signalling messages from said RAN unit to said UE, in particular by transferring Radio Resource Control, RRC, signaling messages, wherein said RRC signaling messages define said mapping in accordance with said mapping rule being any one of:
mapping data packets received at an ingress RLC channel to an egress RLC channel supporting similar QoS;
mapping data packets received at an ingress RLC channel to an egress RLC channel at least supporting said required QoS;
mapping data packets received at an ingress RLC channel to an egress RLC channel having similar RLC channel configurations; or
mapping data packets received at an ingress RLC channel to an egress RLC channel in accordance with momentary data exchange conditions of an egress RLC channel.

14. A Radio Access Network, RAN, unit, the RAN unit comprising:
radio transceiver equipment; and
at least one processor operatively associated with the radio transceiver equipment, the at least one processor configured to operate a protocol stack having an ingress and egress, said protocol stack at least arranged for providing Physical (PHY) layer functionality, Media Access Control (MAC) layer functionality, Radio Link Control (RLC) layer functionality, Adaptation (Adapt) layer functionality, Packet Data Convergence Protocol (PDCP) layer functionality, and Service Data Adaptation Protocol (SDAP) layer functionality, said RLC layer functionality providing a plurality of ingress and egress RLC channels for transferring data packets, and said Adapt layer functionality comprising a mapping rule for configuring Adapt layer functionality of a User Equipment (UE) for performing transfer of data packets requiring a specified Quality of Service (QOS) in an end-to-end (E2E) multi-hop sidelink radio communication destining said data packets while maintaining said specified QoS; and
said at least one processor configured to:
configure said Adapt layer functionality of said UE based on said mapping rule, at RLC channel level, comprised by said Adapt layer functionality of said RAN unit, by transferring signalling messages from said RAN unit to said UE, in particular by transferring Radio Resource Control, RRC, signaling messages, wherein said RRC signaling messages define said mapping in accordance with said mapping rule being any one of:
mapping data packets received at an ingress RLC channel to an egress RLC channel supporting similar QoS;
mapping data packets received at an ingress RLC channel to an egress RLC channel at least supporting said required QoS;

mapping data packets received at an ingress RLC channel to an egress RLC channel having similar RLC channel configurations; or mapping data packets received at an ingress RLC channel to an egress RLC channel in accordance with momentary data exchange conditions of an egress RLC channel.

\* \* \* \* \*